(12) United States Patent
Blabes et al.

(10) Patent No.: US 11,318,541 B2
(45) Date of Patent: May 3, 2022

(54) LIGHT-WEIGHT TOOL HOLDER WITH COOLANT CAVITY HAVING VARYING CROSS-SECTIONAL AREA AND CUTTING TOOL

(71) Applicant: Iscar, Ltd., Tefen (IL)

(72) Inventors: Chen Blabes, Kiryat Ata (IL); Hadas Moyal, Tal El (IL)

(73) Assignee: Iscar, Ltd., Tefen (IL)

( * ) Notice: Subject to any disclaimer, the term of this patent is extended or adjusted under 35 U.S.C. 154(b) by 205 days.

(21) Appl. No.: 16/916,622

(22) Filed: Jun. 30, 2020

(65) Prior Publication Data

US 2021/0402489 A1 Dec. 30, 2021

(51) Int. Cl.
*B23B 27/10* (2006.01)
*B23B 29/12* (2006.01)

(52) U.S. Cl.
CPC .............. *B23B 29/12* (2013.01); *B23B 27/10* (2013.01); *B23B 2250/12* (2013.01)

(58) Field of Classification Search
CPC ......... B23B 27/10; B23B 27/08; B23B 29/12; B23B 29/04; B23B 2250/12; B23B 2250/122; B23Q 11/10
See application file for complete search history.

(56) References Cited

U.S. PATENT DOCUMENTS

| 3,798,725 A | 3/1974 | Hanson |
| 5,799,553 A * | 9/1998 | Billatos .................. B23B 27/10 82/900 |
| 7,959,384 B2 | 6/2011 | Breisch |
| 9,975,182 B2 | 5/2018 | Stoyanov |
| 10,343,222 B2 | 7/2019 | Schwagerle et al. |

(Continued)

FOREIGN PATENT DOCUMENTS

| CN | 204018757 | 12/2014 |
| DE | 10 2014 208130 | 11/2015 |
| DE | 102016221518 A1 * | 3/2018 |

(Continued)

OTHER PUBLICATIONS

International Search Report dated Aug. 24, 2021, issued in PCT counterpart application (No. PCT/IL2021/050654).

(Continued)

*Primary Examiner* — Alan Snyder
(74) *Attorney, Agent, or Firm* — Womble Bond Dickinson (US) LLP (57) ABSTRACT

A tool holder includes a coolant cavity opening out to a cavity inlet and outlet openings. The coolant cavity includes a cavity upper surface which extends along a cavity central axis. The cavity upper surface includes a cavity widening surface firstly which decreases in distance from the holder peripheral surface and secondly along which the cavity cross-sectional area increases, both with increasing distance from the cavity inlet opening. The cavity upper surface also includes a cavity narrowing surface, located further from the cavity inlet opening than the cavity widening surface, firstly which increases in distance from the holder peripheral surface and secondly along which the cavity cross-sectional area decreases, with increasing distance from the cavity inlet opening. A cutting tool is provided having a cutting insert releasably attached to the tool holder.

34 Claims, 4 Drawing Sheets

(56) References Cited

U.S. PATENT DOCUMENTS

2012/0230780 A1    9/2012   Henry et al.
2015/0003921 A1    1/2015   Andersson et al.

FOREIGN PATENT DOCUMENTS

| DE | 112018001055 | 11/2019 |
|----|--------------|---------|
| JP | 2006-326696  | 12/2006 |
| JP | 2019-123041  | 7/2019  |

OTHER PUBLICATIONS

Written Opinion dated Aug. 24, 2021, issued in PCT counterpart application (No. PCT/IL2021/050654).

* cited by examiner

LIGHT-WEIGHT TOOL HOLDER WITH COOLANT CAVITY HAVING VARYING CROSS-SECTIONAL AREA AND CUTTING TOOL

FIELD OF THE INVENTION

The subject matter of the present application relates to tool holders, in general, and to tool holders having a coolant channel, in particular, and to such tool holders which also have a weight-reduction arrangement in order to reduce the weight of the tool holder, further in particular.

BACKGROUND OF THE INVENTION

As is known in the field of metal cutting, tool holders can be provided with a cooling arrangement for providing coolant to the cutting region. Examples of such tool holders are disclosed in, for example, US 2015/0003921 A1, U.S. Pat. No. 3,798,725, US 2012/0230780 A1 and U.S. Pat. No. 7,959,384 B2, where the cooling arrangement is formed by an internal coolant channel.

These internal coolant channels are solely designed for the optimal conveyance of cooling fluid but provide a co-incidental effect of reducing the weight of the tool holder (by virtue of the region devoid of material that forms the coolant channel). However, the relatively small void region is insufficient to provide any substantial weight reduction.

As is also known in the field of metal cutting, tool holders can be provided with a weight-reduction arrangement for reducing the weight of the tool holder (i.e. the tool holders can be light-weight). An example of such a tool holder is disclosed in JP 2006326696, which has an enlarged internal cavity. The internal cavity is unsupported. In order to increase the strength and rigidity of the tool holder, it may be necessary to provide support to the cavity. Examples of such tool holders are disclosed in, for example, U.S. Pat. No. 9,975,182 B2 and JP 6379311 B 1, which have internal cavities supported by a honeycomb or lattice type structure. Another example is disclosed in, for example, DE 10 2014 208 130 A1, which has a weight-reduction void which opens out to a periphery of the tool holder. The weight-reduction void has a lattice/truss type structure. In the examples above, the weight-reduction arrangements are not configured to provide any cooling functionality.

It may be desirable to provide tool holders with a cooling arrangement and a weight-reduction arrangement. An example of a such tool holder is disclosed in, for example, CN204018757U, which has a tool holder having a cooling pipe extending through a weight-reducing internal cavity. The cooling arrangement is separate from the weight-reduction arrangement, in that the weight-reducing internal cavity does not form any part of the cooling pipe.

It is an object of the subject matter of the present application to provide tool holder having a void that serves to reduce the weight of the tool holder and also act as a cooling channel to convey coolant to the cutting region.

SUMMARY OF THE INVENTION

In accordance with a first aspect of the subject matter of the present application there is provided a light-weight tool holder, elongated along a holder longitudinal axis thereof, the holder longitudinal axis defining opposite forward and rearward directions, the tool holder being integrally formed to have unitary one-piece construction and comprising:

a holder forward end surface, a holder rearward end surface and a holder peripheral surface extending therebetween, the holder peripheral surface extending about the holder longitudinal axis;

an insert pocket, for releasably retaining a cutting insert, located at a forward end of the tool holder;

a shank portion extending rearwardly from the insert pocket; and a coolant cavity having a cavity central axis, a cavity inlet opening, at least one cavity outlet opening and a cavity weight-reducing portion between the cavity inlet opening and the at least one cavity outlet opening; wherein:

the cavity weight reducing portion has a cavity cross-sectional area extending in a radial plane perpendicular to the holder longitudinal axis; and the cavity weight reducing portion comprises a cavity weight-reducing peripheral surface, extending about the cavity central axis, and comprising a cavity upper surface extending along the cavity central axis, the cavity upper surface comprising:

a cavity widening surface portion, which decreases in distance from the holder peripheral surface, and along which the cavity cross-sectional area increases, both with increasing distance from the cavity inlet opening; and a cavity narrowing surface portion, located further from the cavity inlet opening than the cavity widening surface portion, which increases in distance from the holder peripheral surface, and along which the cavity cross-sectional area decreases, both with increasing distance from the cavity inlet opening.

In accordance with a second aspect of the subject matter of the present application there is provided a cutting tool comprising:

a tool holder of the type described above; and a cutting insert, having a cutting edge and being releasably retained in the insert pocket.

In accordance with a third aspect of the subject matter of the present application there is provided a light-weight tool holder, elongated along a holder longitudinal axis thereof, the holder longitudinal axis defining opposite forward and rearward directions, the tool holder being integrally formed to have unitary one-piece construction and comprising:

a holder forward end surface, a holder rearward end surface and a holder peripheral surface extending therebetween, the holder peripheral surface extending about the holder longitudinal axis;

an insert pocket, for releasably retaining a cutting insert, located at a forward end of the tool holder;

a shank portion extending rearwardly from the insert pocket; and a coolant cavity having a cavity central axis, a cavity inlet opening, at least one cavity outlet opening and a cavity weight-reducing portion between the cavity inlet opening and the at least one cavity outlet opening; wherein:

a length of the cavity weight reducing portion extends between 50%-90% of a distance along the holder longitudinal axis between the cavity inlet opening and the at least one outlet opening;

along a length of the cavity weight reducing portion, the coolant cavity has a cavity volume VC and the tool holder has a total volume of VT; and the cavity volume and the tool holder volume have a ratio that satisfies $0.2 \leq VC/VT \leq 0.7$.

It is understood that the above-said is a summary, and that features described hereinafter may be applicable in any combination to the subject matter of the present application, for example, any of the following features may be applicable to the tool holder or the cutting tool:

The cavity widening surface portion and the cavity narrowing surface portion can adjoin each other.

The tool holder can be solid between the cavity narrowing surface portion and the holder peripheral surface.

The cavity upper surface can further comprise an auxiliary cavity widening surface portion, located further from the cavity inlet opening than the cavity narrowing surface portion. The auxiliary cavity widening surface portion can decrease in distance from the holder peripheral surface, with increasing distance from the cavity inlet opening. The cavity cross-sectional area can increase with increasing distance from the cavity inlet opening.

The auxiliary cavity widening surface portion and the cavity narrowing surface portion can adjoin each other.

The auxiliary cavity widening surface portion can extend between rearward and forward auxiliary widened cavity planes which are oriented perpendicular to the holder longitudinal axis, the forward auxiliary widened cavity plane being further from the cavity inlet opening than the rearward auxiliary widened cavity plane.

A portion of the auxiliary cavity widening surface portion adjoining the rearward auxiliary widened cavity plane can be convexly curved or prismatically convex, when viewed in a longitudinal plane containing the cavity central axis and intersecting the cavity upper surface.

The cavity widening surface portion can extend between rearward and forward widened cavity planes which are oriented perpendicular to the holder longitudinal axis, the forward widened cavity plane being further from the cavity inlet opening than the rearward widened cavity plane. The cavity narrowing surface portion can extend between rearward and forward narrowed cavity planes which are oriented perpendicular to the holder longitudinal axis, the forward narrowed cavity plane being further from the cavity inlet opening than the rearward narrowed cavity plane.

The cavity cross-sectional area at the forward widened cavity plane can be greater than twice the cavity cross-sectional area at the forward narrowed cavity plane.

The rearward and forward widened cavity planes can be spaced apart by a widening distance. The rearward and forward narrowed cavity planes can be spaced apart by a narrowing distance. The narrowing distance can be greater than the widening distance.

A portion of the cavity widening surface portion adjacent the forward widened cavity plane can be concavely curved, or prismatically concave, when viewed in a longitudinal plane containing the cavity central axis and intersecting the cavity upper surface.

A portion of the cavity narrowing surface portion adjacent the rearward narrowing cavity plane can be concavely curved, or prismatically concave, when viewed in a longitudinal plane containing the cavity central axis and intersecting the cavity upper surface.

A portion of the cavity narrowing surface portion adjoining the forward narrowing cavity plane can be convexly curved or prismatically convex, when viewed in a longitudinal plane containing the cavity central axis and intersecting the cavity upper surface.

The holder peripheral surface can comprise opposite holder top and bottom surfaces and two opposite holder side surfaces connecting the holder top and bottom surfaces. The insert pocket can be located at the intersection of the holder top surface and the holder forward end surface.

The tool holder comprises a holder vertical axis extending perpendicularly to the holder longitudinal axis and intersecting the holder top and bottom surfaces. The tool holder comprises a holder lateral axis extending perpendicularly to the holder longitudinal axis and intersecting the two holder side surfaces. The tool holder can be narrower along the holder lateral axis than along the holder vertical axis, and also narrower along the holder vertical axis than the holder longitudinal axis.

The cavity weight-reducing peripheral surface can comprise a cavity lower surface opposite the cavity upper surface, the cavity upper surface being closer to the holder top surface than the cavity lower surface and two opposite cavity side surfaces extending between the cavity effective and non-effective surfaces.

The cavity weight-reducing portion can comprise a cavity major portion. At the cavity major portion, the cavity side surfaces can be planar and parallel with each other.

At the cavity major portion at least one of the cavity upper surface and the cavity lower surface can be prismatically concave, having two sub-surfaces which extend from the cavity side surfaces and intersect with each other.

The tool holder can further comprise a second insert pocket and a second coolant cavity, the second insert pocket being located at the intersection of the holder top surface and the holder rearward end surface, and a third insert pocket and a third coolant cavity, the third insert pocket being located at the intersection of the holder bottom surface and the holder forward end surface, and a fourth insert pocket and a fourth coolant cavity, the fourth insert pocket being located at the intersection of the holder bottom surface and the holder rearward end surface.

The tool holder comprises a holder vertical axis extending perpendicularly to the holder longitudinal axis and intersecting the holder top and bottom surfaces. The tool holder comprises a holder lateral axis extending perpendicularly to the holder longitudinal axis and intersecting the two holder side surfaces. The tool holder can be 180° rotationally symmetric about at least one of the holder vertical axis, the holder longitudinal axis and the holder lateral axis.

The cavity inlet opening can be formed on the holder peripheral surface.

The coolant cavity can comprise a cavity lateral portion which comprises a lateral portion peripheral surface extending about a lateral portion axis from the cavity inlet opening.

The cavity lateral portion can have a lateral portion cross-sectional area extending in a radial plane perpendicular to the lateral portion axis. A maximum lateral portion cross-sectional area can be less than the cavity cross-sectional area at the forward narrowed cavity plane.

The cavity widening surface portion can extend to the lateral portion peripheral surface.

The coolant cavity can comprise a cavity entrance portion which comprises opposing entrance inner and outer surfaces and two opposing entrance side surfaces which connect the entrance inner and outer surfaces, the entrance outer surface being closer to the holder top surface than the entrance inner surface. The entrance inner and outer surfaces and the two entrance side surfaces can intersect the lateral portion peripheral surface forming an elongated through-pass, the through-pass being formed on an angular extent of the lateral portion peripheral surface.

The entrance outer surface can be formed from a portion of the cavity widening surface portion.

The cavity inlet opening can open out to one of the holder peripheral surface and the holder rearward end surface at the shank portion. The at least one cavity outlet opening can open out to one of the holder peripheral surface and the holder forward end surface adjacent the insert pocket.

A length of the cavity weight reducing portion can extend between 50%-90% of a distance along the holder longitudinal axis between the cavity inlet opening and the at least one outlet opening.

Along a length of the cavity weight reducing portion, the coolant cavity has a cavity volume VC and the tool holder has a total volume of VT. The cavity volume and the tool holder volume can have a ratio that satisfies $0.2 \leq VC/VT \leq 0.7$.

The holder peripheral surface can comprise opposite holder top and bottom surfaces and two opposite holder side surfaces connecting the holder top and bottom surfaces. The tool holder has a holder height between the holder top and bottom surfaces. The cavity weight-reducing portion can comprise a cavity major portion. At the cavity major portion, the cavity side surfaces can be planar and parallel with each other. Along the cavity major portion, the coolant cavity has a maximum height that can be at least 35% of the holder height and a minimum height that can be at least 10% of the holder height.

The cutting tool can further comprise three additional cutting inserts. Each cutting insert can be releasably retained in a respective one of the second, third and fourth insert pockets.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
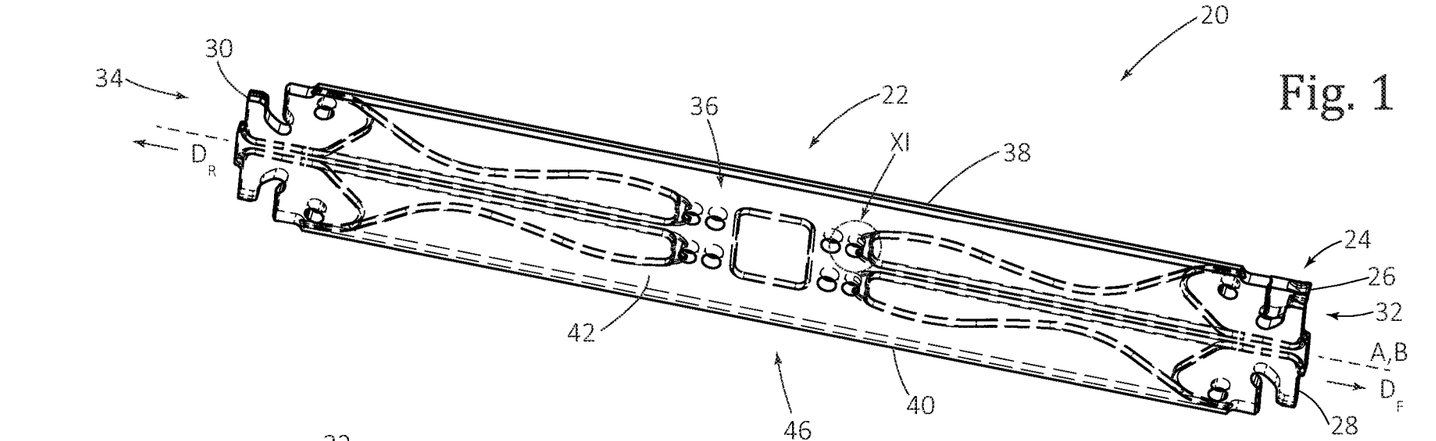
FIG. 1 is a perspective view of a cutting tool, in accordance with the present application, showing a hidden coolant cavity.

Attention is first drawn to FIG. 1 showing a cutting tool 20, for chip removal, depicting an aspect of the present application. The cutting tool 20 has a tool longitudinal axis A. In accordance with some embodiments of the subject matter of the present application, the cutting tool 20 can be a non-rotary cutting tool. That is to say, the cutting tool 20 is fixed and not designed to rotate about a rotational axis. In the non-limiting example shown in the drawings, the cutting tool 20 is a grooving/parting tool. However, the subject matter of the present application is not restricted only to grooving/parting tools and could also be applicable to, for example but not limited to, turning tools.

The cutting tool 20 includes a tool holder 22, which is described in detail further on in the description. The cutting tool 20 also includes a cutting insert 24. The cutting insert 24 has a cutting edge 26 designed to perform metal cutting operations. The cutting insert 24 is typically made from carbide. The cutting insert 24 can be resiliently attached to the tool holder 22.

Figure 2:
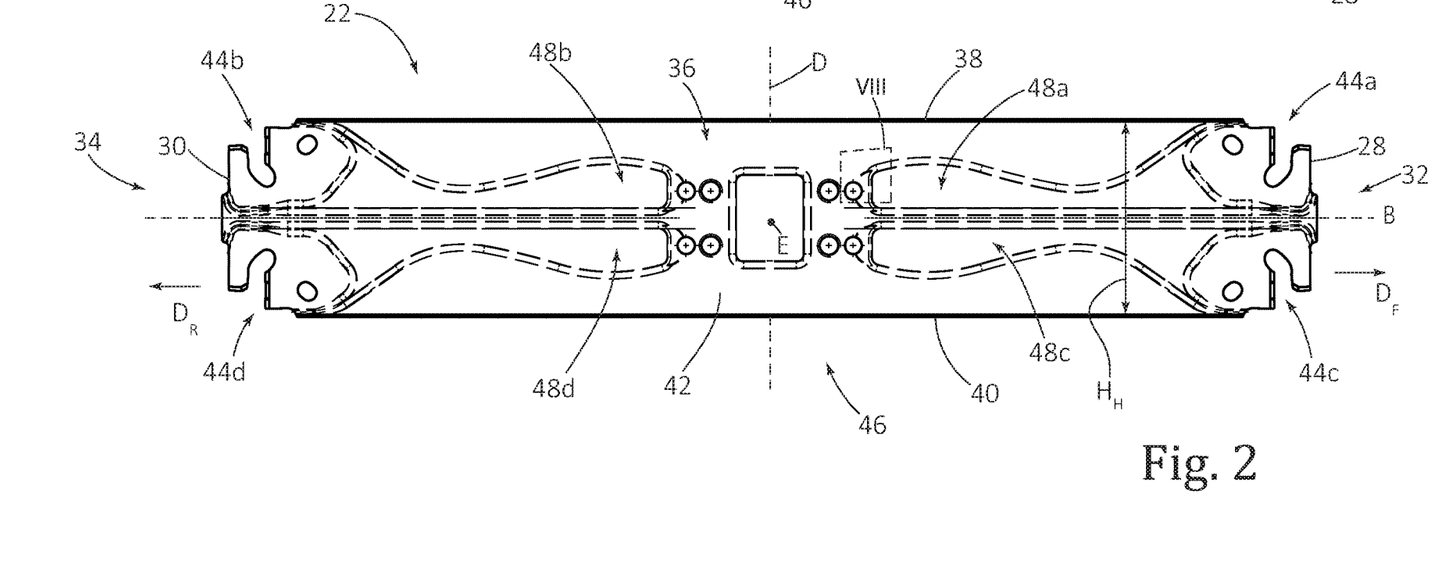
FIG. 2 is a side view of a tool holder in FIG. 1.

Reference is now made to FIG. 2, showing the tool holder 22, depicting another aspect of the present application. The tool holder 22 is typically made of steel. The tool holder 22 has a holder longitudinal axis B, that defines opposite forward and rear directions $D_F$, $D_R$. The tool holder 22 is elongated along the holder longitudinal axis B. In accordance with some embodiments of the subject matter of the present application, the cutting tool 20 and the tool holder 22 can be co-axial with each other. It should be noted that two elements (e.g. the cutting tool 20 and the tool holder 22 in the present case) are co-axial with each other when their longitudinal axes are co-incident (aligned with other).

It should further be noted that use of the terms "forward" and "rearward" throughout the description and claims refer to a relative position in a direction of the holder longitudinal axis B upwardly and downwardly, respectively, in FIG. 2. Generally speaking, the forward direction is the direction towards the cutting insert 24.

The tool holder 22 is additively manufactured. The tool holder 22 is integrally formed to have unitary one-piece construction. As used herein, an item is said to have "unitary one-piece construction" if it results from an additive manufacturing process, even if more than one material is used during the additive manufacture of that item.

It should be noted that use of the term "additively manufactured" throughout the description and claims refers to refers to processes used to create a three-dimensional object in which layers of material are formed to create an object. Examples of such processes include, but are not limited to, Selective Laser Melting (SLAM), Selective Laser Sintering (SLS), Direct Metal Laser Sintering (DMLS), Fused Deposition Modeling (FDM) and 3D Printing.

Referring to FIGS. 1 to 2, the tool holder 22 includes a holder forward end surface 28 and a holder rearward end surface 30 opposite the holder forward end surface 28. The holder forward end surface 28 is located at a forward end 32 of the tool holder 22. The holder rearward end surface 30 is located at a rearward end 34 of the tool holder 22. The holder forward and rearward surfaces 28, 30 can be intersected by the holder longitudinal axis B. The tool holder 22 further includes a holder peripheral surface 36 extending between the holder forward end surface 28 and the holder rearward end surface 30. The holder peripheral surface 36 extends about the holder longitudinal axis B.

In accordance with some embodiments of the subject matter of the present application, the holder peripheral surface 36 can include opposite holder top and bottom surfaces 38, 40. The tool holder 22 can further include two opposite holder side surfaces 42 connecting the holder top and bottom surfaces 38, 40. The tool holder 22 may have a holder height $H_H$ defined between the opposite holder top and bottom surfaces 38, 40 and a holder width $H_W$ defined between the two opposite holder side surfaces 42.

In accordance with some embodiments of the subject matter of the present application, the tool holder 22 can have a holder vertical axis D which extends perpendicularly to the holder longitudinal axis B and intersects the holder top and bottom surfaces 38, 40. The tool holder 22 can include a holder lateral axis E which extends perpendicularly to the holder longitudinal axis B and intersects the two holder side surfaces 42.

Referring to FIGS. 4-7, the tool holder 22 has a holder cross-sectional area HA extending in a radial plane perpendicular to the holder longitudinal axis B. The holder cross-sectional area HA is defined by the area enclosed by the holder peripheral surface 36.

Reverting to FIG. 1, the tool holder 22 includes an insert pocket 44a, for receiving the cutting insert 24. The insert pocket 44a is located at the forward end 32. In accordance with some embodiments of the subject matter of the present application, the insert pocket 44a can be located at the intersection of the holder top surface 38 and the holder forward end surface 28. The insert pocket 44a can extend to the two holder side surfaces 42. In an assembled position of the cutting tool 20, the cutting insert 24 can be releasably retained in the insert pocket 44a.

The tool holder 22 includes a shank portion 46 which extends rearwardly from the insert pocket 44a. The shank portion 46 includes a means to attach the tool holder 22 to an adaptor (not shown). In accordance with some embodiments of the subject matter of the present application, the holder cross-sectional area HA at the shank portion 46 can be constant along the holder longitudinal axis B.

Figure 3:
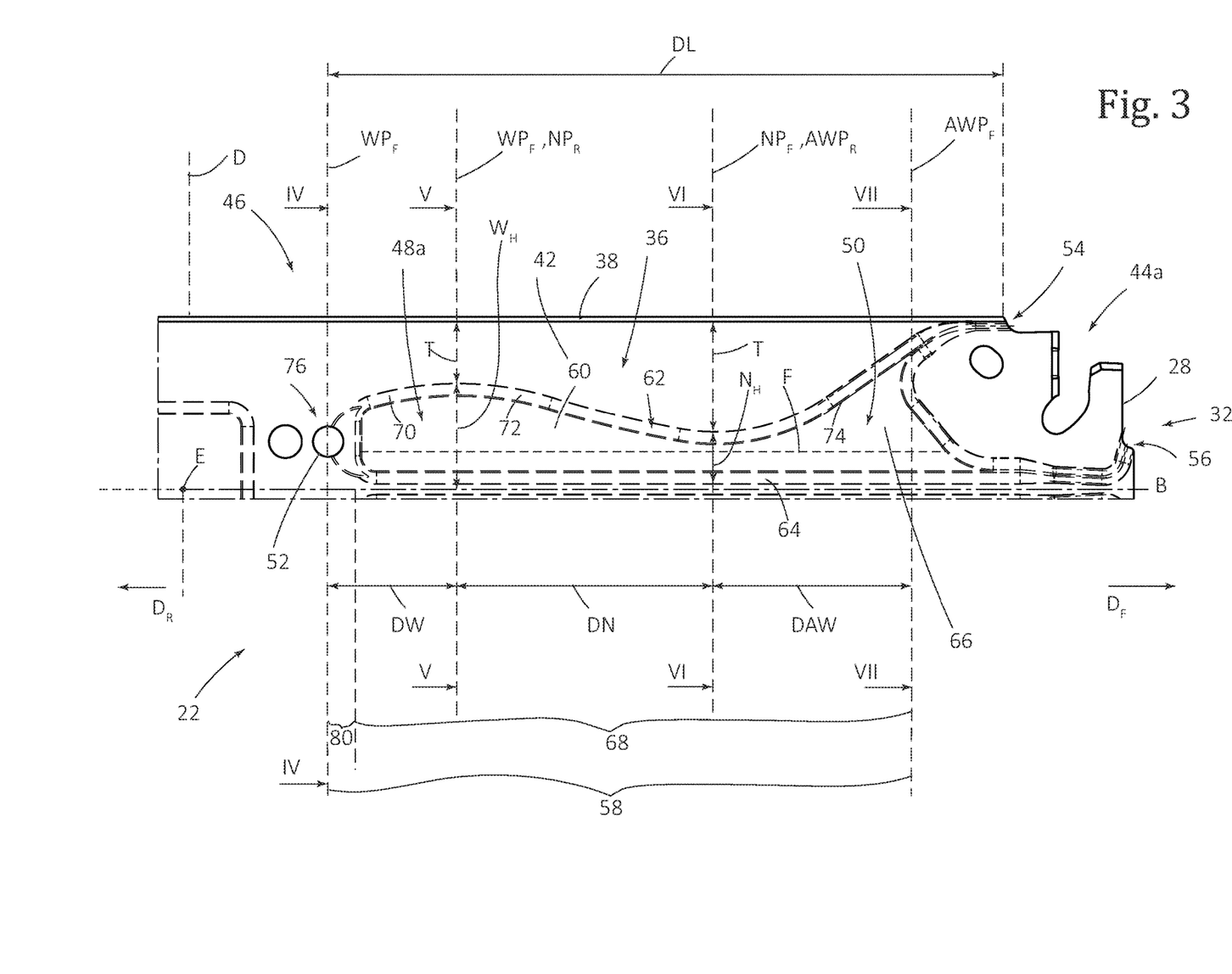
FIG. 3 is a detail of FIG. 2.

Referring to FIGS. 2 and 3, the tool holder 22 includes a coolant cavity 48a formed within the tool holder 22 (the coolant cavity 48a is hidden and is thus indicated by dashed lines). Stated differently, the coolant cavity 48a is enclosed within the tool holder 22. Thus, the tool holder 22 is hollow. The coolant cavity 48a is designed to allow the conveyance of coolant towards the cutting insert 24. The coolant cavity 48a is also designed to reduce the weight of the tool holder 22. In accordance with some embodiments of the subject matter of the present application, the coolant cavity 48a is spaced apart from the holder longitudinal axis B. That is to say, the coolant cavity 48a may not be intersected by the holder longitudinal axis B.

The coolant cavity 48a has a cavity central axis F. The coolant cavity 48a is defined by a cavity peripheral surface 50 within the tool holder 22. Generally speaking, the cavity peripheral surface 50 faces inwardly.

The coolant cavity 48a includes a cavity inlet opening 52. Coolant enters the coolant cavity 48a through the cavity inlet opening 52. In the embodiment shown in the figures, the coolant cavity 48a opens out to the holder peripheral surface 36 at the shank portion 46 to form the cavity inlet opening 52. The cavity inlet opening 52 is formed at the intersection of the cavity peripheral surface 50 and the holder peripheral surface 36 at the shank portion 46.

In other embodiments, such as in certain turning tools (not shown) having a single cutting portion provided at the end of a shank portion, the coolant cavity may open out at a cavity inlet opening provided at the rear end of the shank portion. In such case, the cavity inlet opening may be formed at the intersection of the cavity peripheral surface and the shank's rear end surface (i.e. the holder rearward end surface 30).

The coolant cavity 48a includes at least one cavity outlet opening 54. Coolant exits the coolant cavity 48a through the at least one cavity outlet opening 54. In accordance with some embodiments of the subject matter of the present application, the coolant cavity 48a can open out to one of the holder peripheral surface 36 and the holder forward end surface 28 adjacent the insert pocket 44a to form the cavity outlet opening 54. The cavity outlet opening 54 is formed at the intersection of the cavity peripheral surface 50 and one of the holder peripheral surface 36 and the holder forward end surface 28 adjacent the insert pocket 44a. The cavity peripheral surface 50 extends from the cavity inlet opening 52 to the cavity outlet opening 54. The cavity inlet opening 52 is designed to be in fluid communication with the cavity outlet opening 54 for the conveyance of coolant to the cutting insert 24.

In the embodiment shown in the figures, the coolant cavity 48a can further open out to whichever one of the holder peripheral surface 36 and the holder forward end surface 28 the cavity outlet opening 54 does not open out to forming a second cavity outlet opening 56, such that the coolant cavity 48a has a bifurcated configuration. The cavity inlet opening 52 can be in fluid communication with the second cavity outlet opening 56 for the conveyance of coolant to the cutting insert 24 from a different direction as that of the cavity outlet opening 54.

The coolant cavity 48a includes a cavity weight-reducing portion 58. The cavity weight-reducing portion 58 is located between the cavity inlet opening 52 and the cavity outlet opening(s) 54, 56. With reference to FIG. 3, in accordance with some embodiments of the subject matter of the present application, the cavity weight-reducing portion 58 can be rotationally asymmetric about the cavity central axis F. For example, the cavity weight-reducing portion 58 may not have a cylindrical or conical shape.

The cavity weight-reducing portion 58 includes a cavity weight-reducing peripheral surface 60. The cavity weight-reducing peripheral surface 60 constitutes a portion of the cavity peripheral surface 50. The cavity weight-reducing peripheral surface 60 extends about the cavity central axis F. It is understood that the cavity weight-reducing peripheral surface 60 extends about a full 360° angular extension of the cavity central axis F. In the non-limiting example shown in the drawings, the cavity central axis F is parallel to, and offset from, the holder longitudinal axis B. Moreover, the cavity central axis F is contained in a longitudinal plane LP which passes through the holder top and bottom surfaces 38, 40. The longitudinal plane LP can extend in-between the two holder side surfaces 42. The longitudinal plane LP can be perpendicular to the holder lateral axis E. The longitudinal plane LP can contain the holder longitudinal axis B.

In accordance with some embodiments of the subject matter of the present application, the cavity weight-reducing peripheral surface 60 can include two opposite cavity side surfaces 66. Each cavity side surfaces 66 can extend along a respective holder side surface 42. Generally speaking, the two cavity side surfaces 66 face towards each other. The longitudinal plane LP can extend between the two cavity side surfaces 66.

Figure 5:
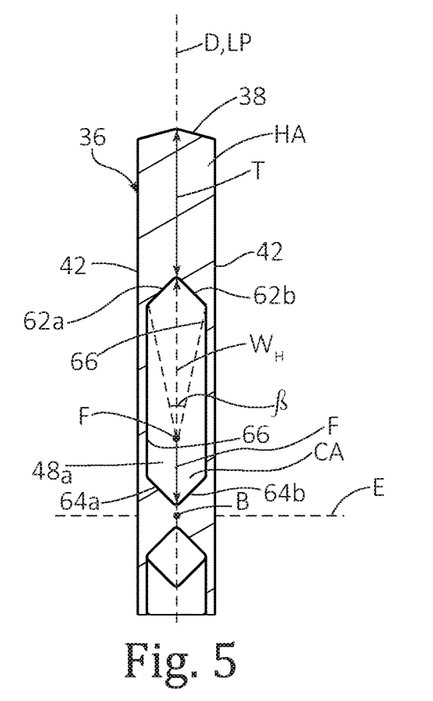
FIG. 5 is a second radial cross-sectional view of the tool holder taken along line V-V in FIG. 3.

The cavity weight-reducing peripheral surface 60 includes a cavity upper surface 62 which extends along the cavity central axis F. The longitudinal plane LP intersects the cavity upper surface 62. In accordance with some embodiments of the subject matter of the present application, the longitudinal plane LP can intersect an entire axial extent of the cavity upper surface 62. The cavity upper surface 62 may not extend about a full 360° angular extension of the cavity central axis F. The cavity upper surface 62 can connect (i.e. extend between) the two cavity side surfaces 66. As seen in FIG. 5, the intersections of the two cavity side surfaces 66 with the cavity upper surface 62 (i.e., at the opposing angular extremities of the cavity upper surface 62) subtend an effective surface angle β relative to the cavity central axis F. The effective surface angle β can be less than 45°. Thus, in the cross-section seen in FIG. 5, the cavity has a vertically elongated diamond shape which is symmetric about the longitudinal plane LP.

In accordance with some embodiments of the subject matter of the present application, the cavity weight-reducing peripheral surface 60 can include a cavity lower surface 64 opposite the cavity upper surface 62. The cavity lower surface 64 can extend along the cavity central axis F. The cavity upper surface 62 can be closer to the holder top surface 38 than the cavity lower surface 64. The cavity lower surface 64 can connect the two cavity side surfaces 66. Generally speaking, the cavity effective and non-effective surfaces 62, 64 face towards each other. The cavity lower surface 64 extends in a direction parallel to the holder longitudinal axis B.

In accordance with some embodiments of the subject matter of the present application, the cavity weight-reducing portion 58 can include a cavity major portion 68. At the cavity major portion 68, the cavity side surfaces 66 can be planar and parallel with each other. Moreover, referring to FIGS. 4-7, at the cavity major portion 68, at least one of the cavity upper surface 62 and the cavity lower surface 64 can be prismatically concave, having two sub-surfaces 62a, 62b, 64a, 64b which extend from the cavity side surfaces 66 and intersect with each other. Stated differently, at least one of the cavity upper surface 62 and the cavity lower surface 64 can be V-shaped (the English letter "V"). It is noted that the term "prismatically concave" or "prismatically convex" throughout the description and claims refers to a surface that is multi-faceted. In the non-limiting example shown in the drawings, both the cavity upper surface 62 and the cavity lower surface 64 can be prismatically concave.

The tool holder 22 has a holder outer thickness T, measured between the cavity upper surface 62 and the holder peripheral surface 36 in a direction parallel to the holder vertical axis D. It is noted that in the configuration where the cavity upper surface 62 is closer to the holder top surface 38 than the cavity lower surface 64, the holder outer thickness T is measured between the cavity upper surface 62 and the holder top surface 38.

Referring now to FIGS. 4-7, the cavity weight-reducing portion 58 has a cavity cross-sectional area CA extending in a radial plane perpendicular to the holder longitudinal axis B. The cavity cross-sectional area CA is defined by the area enclosed by the cavity weight-reducing peripheral surface 60. In accordance with some embodiments of the subject matter of the present application, the cavity cross-sectional area CA can be a single continuous area, as opposed to, for example, two separate areas. The coolant cavity 48a at the cavity weight-reducing portion 58 can be a continuous void. For example, the coolant cavity 48a at the cavity weight-reducing portion 58 can be devoid of any lattice/truss type structure designed to support the coolant cavity 48a. Thus, the tool holder 22 has a simple design.

The cavity cross-sectional area CA varies along the cavity central axis F and therefore is not constant along the length of the cavity weight reducing portion 58. In other words, the cavity cross-sectional area CA varies in the direction of coolant flow along the cavity weight reducing portion 58.

Along the cavity weight reducing portion 58, the cavity upper surface 62 may include a plurality of surface portions 70, 72, 74.

The cavity upper surface 62 includes a cavity widening surface portion 70. As shown in FIG. 3, a height of the cavity widening surface portion 70 increases with increasing distance from the cavity inlet opening 52. Restated, the cavity widening surface portion 70 decreases in distance from the holder peripheral surface 36, with increasing distance from the cavity inlet opening 52. Thus, along the cavity widening surface portion 70 the holder outer thickness T decreases with increasing distance from the cavity inlet opening 52. Along the cavity widening surface portion 70, the cavity cross sectional area CA increases with increasing distance from the cavity inlet opening 52 (where it is understood that the radial plane used to define the cavity cross sectional area CA intersects the cavity widening surface portion 70). This has the effect of reducing the weight of the tool holder 22. In accordance with some embodiments of the subject matter of the present application, the cavity widening surface portion 70 can increase in distance from the cavity central axis F, with increasing distance from the cavity inlet opening 52.

Figure 4:
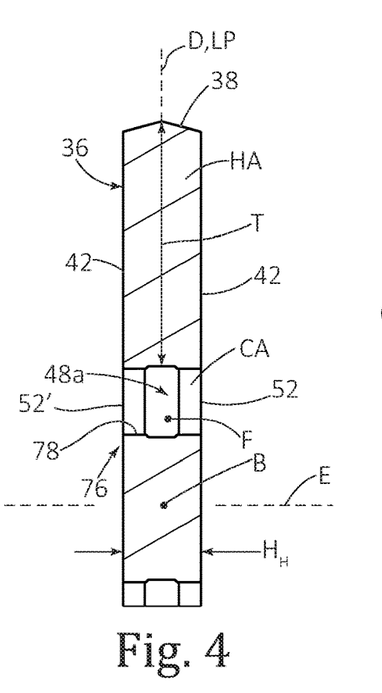
FIG. 4 is a first radial cross-sectional view of the tool holder taken along line IV-IV in FIG. 3.

Reference is now made to FIGS. 3, 4 and 5. In accordance with some embodiments of the subject matter of the present application, the cavity widening surface portion 70 can extend between rearward and forward widened cavity planes $WP_R$, $WP_F$. The rearward and forward widened cavity planes $WP_R$, $WP_F$ are oriented perpendicular to the holder longitudinal axis B. The forward widened cavity plane $WP_F$ is further from the cavity inlet opening 52 than the rearward widened cavity plane $WP_R$. The rearward and forward widened cavity planes $WP_R$, $WP_F$ are spaced apart by a widening distance DW. The coolant cavity 48a has a widened height $W_H$ at the forward widened cavity plane $WP_F$, measured between the cavity upper surface 62 and the cavity lower surface 64. The widened height $W_H$ can be greater than the holder outer thickness T at the forward widened cavity plane $WP_F$.

Reverting to FIG. 3, in accordance with some embodiments of the subject matter of the present application, a portion of the cavity widening surface portion 70 adjacent the forward widened cavity plane $WP_F$ can be concavely curved, or prismatically concave, when viewed in the longitudinal plane LP. Preferably, said portion can be concavely curved.

In accordance with some embodiments of the subject matter of the present application, the tool holder 22 can be solid between the cavity widening surface portion 70 and the holder peripheral surface 36. That is to say, this region is devoid of any cavities or channels.

The cavity upper surface 62 includes a cavity narrowing surface portion 72 axially forward of the cavity widening surface portion 70. As shown in FIG. 3, the cavity narrowing surface portion 72 is further from the cavity inlet opening 52 than the cavity widening surface portion 70. A height of the cavity narrowing surface portion 70 decreases with increasing distance from the cavity inlet opening 52. Restated, the cavity narrowing surface portion 72 increases in distance from the holder peripheral surface 36, with increasing distance from the cavity inlet opening 52. Thus, the holder outer thickness T increases with increasing distance from the cavity inlet opening 52. This has the effect of increasing the rigidity of the tool holder 22. Along the cavity narrowing surface portion 72, the cavity cross sectional area CA decreases with increasing distance from the cavity inlet opening 52 (where it is understood that the radial plane used to define the cavity cross sectional area CA intersects the cavity narrowing surface portion 72). In accordance with some embodiments of the subject matter of the present application, the cavity narrowing surface portion 72 decreases in distance from the cavity central axis F, with increasing distance from the cavity inlet opening 52.

Figure 6:
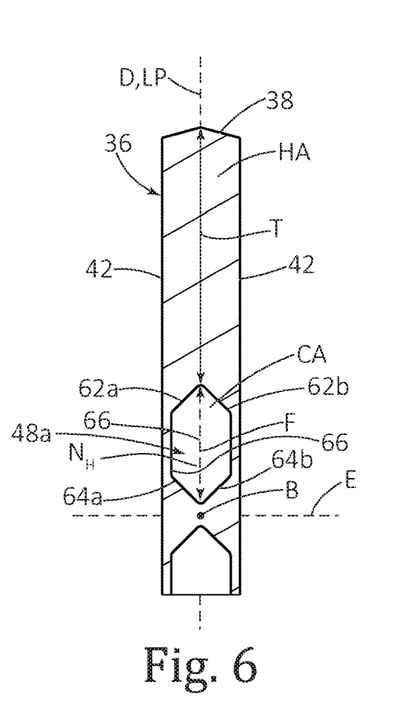
FIG. 6 is a third radial cross-sectional view of the tool holder taken along line VI-VI in FIG. 3.

Reference is now made to FIGS. 3, 5 and 6. In accordance with some embodiments of the subject matter of the present application, the cavity narrowing surface portion 72 can extend between rearward and forward narrowed cavity planes $NP_R$, $NP_F$. The rearward and forward narrowed cavity planes $NP_R$, $NP_F$ are oriented perpendicular to the holder longitudinal axis B. The forward narrowed cavity plane $NP_F$ is further from the cavity inlet opening 52 than the rearward narrowed cavity plane $NP_R$. The rearward and forward narrowed cavity planes $NP_R$, $NP_F$ are spaced apart by a narrowing distance DN. The narrowing distance DN can be greater than the widening distance DW. The coolant cavity 48a has a narrowed height $N_H$ at the forward narrowed cavity plane $NP_F$, measured between the cavity upper surface 62 and the cavity lower surface 64. The narrowed height $N_H$ can be less than the widened height $W_H$. The narrowed height $N_H$ can be less than the holder outer thickness T at the forward narrowed cavity plane $NP_F$.

In some embodiments, along the cavity major portion 68, the coolant cavity 48a has a maximum height (seen in the non-limiting example in FIG. 3 as measured along the forward auxiliary widened cavity plane $AWP_F$) that can be at least 35% of the holder height $H_H$ and a minimum height (seen in the non-limiting example in FIG. 3 as the narrowed height $N_H$) that can be at least 10% of the holder height $H_H$. The coolant cavity 48a has a height (seen in the non-limiting example in FIG. 3 as the widened height $W_H$) that can be at least 20% of the holder height $H_H$.

Reverting to FIG. 3, in accordance with some embodiments of the subject matter of the present application, the cavity cross-sectional area CA at the forward widened cavity plane $WP_F$ can be greater than twice the cavity cross-sectional area CA at the forward narrowed cavity plane $NP_F$.

In accordance with some embodiments of the subject matter of the present application, a portion of the cavity narrowing surface portion 72 adjacent the rearward narrowing cavity plane $NP_R$ can be concavely curved, or prismatically concave, when viewed in the longitudinal plane LP. Preferably, said portion can be concavely curved. A portion of the cavity narrowing surface portion 72 adjacent the forward narrowed cavity plane $NP_F$ can be convexly curved, or prismatically convex, with increasing distance from the forward narrowed cavity plane $NP_F$. Preferably, said portion can be convexly curved.

In accordance with some embodiments of the subject matter of the present application, the tool holder 22 can be solid between the cavity narrowing surface portion 72 and the holder peripheral surface 36. That is to say, this region is devoid of any cavities or channels or the like.

In the bifurcated configuration, in accordance with some embodiments of the subject matter of the present application, the coolant cavity 48a can branch towards the two cavity outlet openings 54, 56 forwardly of the cavity narrowing surface portion 72.

In accordance with some embodiments of the subject matter of the present application, the cavity widening surface portion 70 and the cavity narrowing surface portion 72 can adjoin each other. In such a configuration, the forward widened cavity plane $WP_F$ is co-planar with the rearward narrowing cavity plane $NP_R$. The cavity upper surface 62 changes direction with respect to the holder vertical axis D at the forward widened cavity plane $WP_F$ (and the rearward narrowing cavity plane $NP_R$).

In accordance with some embodiments of the subject matter of the present application, the cavity upper surface 62 can include an auxiliary cavity widening surface portion 74 axially forward of the cavity narrowing surface portion 72. As shown in FIG. 3, the auxiliary cavity widening surface portion 74 can be further from the cavity inlet opening 52 than the cavity narrowing surface portion 72. A height of the auxiliary cavity widening surface portion 74 increases with increasing distance from the cavity inlet opening 52. Restated, the auxiliary cavity widening surface portion 74 can decrease in distance from the holder peripheral surface 36, with increasing distance from the cavity inlet opening 52. Like the cavity widening surface portion 70, the holder outer thickness T decreases with increasing distance from the cavity inlet opening 52. Also, along the auxiliary cavity widening surface portion 74, the cavity cross sectional area CA increases with increasing distance from the cavity inlet opening 52 (where it is understood that the radial plane used to define the cavity cross sectional area CA intersects the auxiliary cavity widening surface portion 74). This has the effect of further reducing the weight of the tool holder 22. The auxiliary cavity widening surface portion 74 can increase in distance from the cavity central axis F, with increasing distance from the cavity inlet opening 52.

Figure 7:
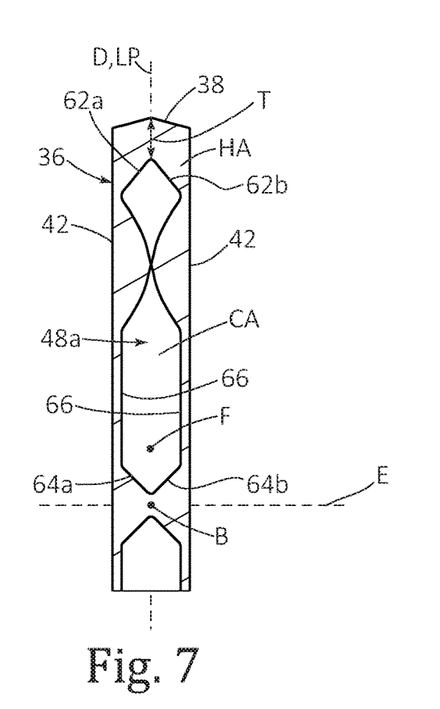
FIG. 7 is a fourth radial cross-sectional view of the tool holder taken along line VII-VII in FIG. 3.

Reference is now made to FIGS. 3, 6 and 7. In accordance with some embodiments of the subject matter of the present application, the auxiliary cavity widening surface portion 74 can extend between rearward and forward auxiliary widened cavity planes $AWP_R$, $AWP_F$. The rearward and forward auxiliary widened cavity planes $AWP_R$, $AWP_F$ are oriented perpendicular to the holder longitudinal axis B. The forward auxiliary widened cavity plane $AWP_F$ is further from the cavity inlet opening 52 than the rearward auxiliary widened cavity plane $AWP_R$. The rearward and forward auxiliary widened cavity planes $AWP_R$, $AWP_F$ are spaced apart by an auxiliary widened distance DAW. The auxiliary widened distance DAW can be greater than the widened distance DW and less than the narrowed distance DN.

It is noted that in the bifurcated configuration, the forward auxiliary widened cavity plane $AWP_F$ is located at the point where the coolant cavity 48a branches towards the two cavity outlet openings 54, 56. Otherwise (i.e. in the non-bifurcated configuration), the forward auxiliary widened cavity plane $AWP_F$ is located where the auxiliary cavity widening surface portion 74 stops decreasing in distance from the holder peripheral surface 36, with increasing distance from the cavity inlet opening 52.

Reverting to FIG. 3, in accordance with some embodiments of the subject matter of the present application, a portion of the auxiliary cavity widening surface portion 74 adjacent the rearward auxiliary widening cavity plane $AWP_R$ can be convexly curved, or prismatically convex, when viewed in the longitudinal plane LP. Preferably, said portion can be convexly curved.

In accordance with some embodiments of the subject matter of the present application, the tool holder 22 can be solid between the auxiliary cavity widening surface portion 74 and the holder peripheral surface 36. That is to say, this region is devoid of any cavities or channels.

In accordance with some embodiments of the subject matter of the present application, the auxiliary cavity widening surface portion 74 and the cavity narrowing surface portion 72 can adjoin each other. In such a configuration, the forward narrowing cavity plane $NP_F$ is co-planar with the rearward auxiliary widened cavity plane $AWP_R$. The cavity upper surface 62 changes direction with respect to the holder vertical axis D at the forward narrowing cavity plane $NP_F$ (and the rearward auxiliary widened cavity plane $AWP_R$).

The length of the cavity weight reducing portion 58 (i.e., in the embodiment shown in FIG. 3, the length given by DW+DN+DAW) extends between 50%-90% of the distance DL along the holder longitudinal axis B between the cavity inlet opening 52 and the closest cavity outlet opening 54, 56.

Also, along the length of the cavity weight reducing portion 58 the coolant cavity 48a has a cavity volume VC, while along the same extent of the tool holder, the tool holder 22 has a total volume of VT. And in a typical tool holder design, the cavity volume and the tool holder volume have a ratio that satisfies 0.2≤VC/VT≤0.7. However, ratios outside this range may also be possible while achieving meaningful weight savings and effective tool holder rigidity. In the non-limiting example shown in the drawings (i.e. having two coolant cavities 48a, 48b, 48c, 48d at each end of the tool holder 22), the cavity volume and the tool holder volume have a ratio that satisfies 0.2≤VC/VT≤0.4.

In accordance with some embodiments of the subject matter of the present application, the tool holder 22 can be narrower along the holder lateral axis E than along the holder vertical axis D. That is to say, the holder width $H_W$ can be less than the holder height $H_H$. The tool holder 22 can be narrower along the holder vertical axis D than the holder longitudinal axis B. That is to say, the holder width $H_W$ can be less than the length of the tool holder 22. In particular, the tool holder 22 can be of the type known in the field of metal cutting as a parting blade, designed to be part of a cutting tool suitable for grooving/parting/cut-off cutting operations. In such a tool holder the two holder side surfaces 42 can be parallel to each other. The blade can have a rectangular basic shape having four quadrants. The quadrants can be identical.

In accordance with some embodiments of the subject matter of the present application, the tool holder 22 can include a second insert pocket 44b and a second coolant cavity 48b. The second insert pocket 44b is located at the intersection of the holder top surface 38 and the holder rearward end surface 30. In such a configuration the shank portion 28 can be located between the forward and rearward ends 32, 34. The tool holder 22 can include a third insert pocket 44c and a third coolant cavity 48c. The third insert pocket 44c can be located at the intersection of the holder bottom surface 40 and the holder forward end surface 28. The tool holder 22 can include a fourth insert pocket 44d and a fourth coolant cavity 48d. The fourth insert pocket 44d can be located at the intersection of the holder bottom surface 40 and the holder rearward end surface 30. The four insert pockets 44a, 44b, 44c, 44d are located in separate quadrants. In such a configuration, the cutting tool 20 correspondingly has four cutting inserts 24. Each cutting insert 24 is releasably retained in a respective one of the second, third and fourth insert pockets 44b, 44c, 44d. One of the cutting inserts 24 is active (that is to say, actively used for metal cutting), while the remaining three cutting inserts 24 are non-active. The cutting tool 20 can be indexed so that one of non-active cutting inserts 24 becomes active and vice versa. The tool holder 22 can be 180° rotationally symmetric about the holder vertical axis D and/or the holder longitudinal axis B and/or the holder lateral axis E. Stated differently, the tool holder 22 can be 180° rotationally symmetric about at least one of the holder vertical axis D, the holder longitudinal axis B and the holder lateral axis E. The tool holder 22 can be 180° rotationally symmetric about the holder vertical axis D, the holder longitudinal axis B and the holder lateral axis E. It is noted that any characteristic mentioned in the foregoing relating to the coolant cavity 48a can apply also to any or all of the second, third and fourth coolant cavities 48b, 48c, 48d, mutatis mutandis. The cooling cavities 48a, 48b, 48c, 48d can be identical.

Figure 8:
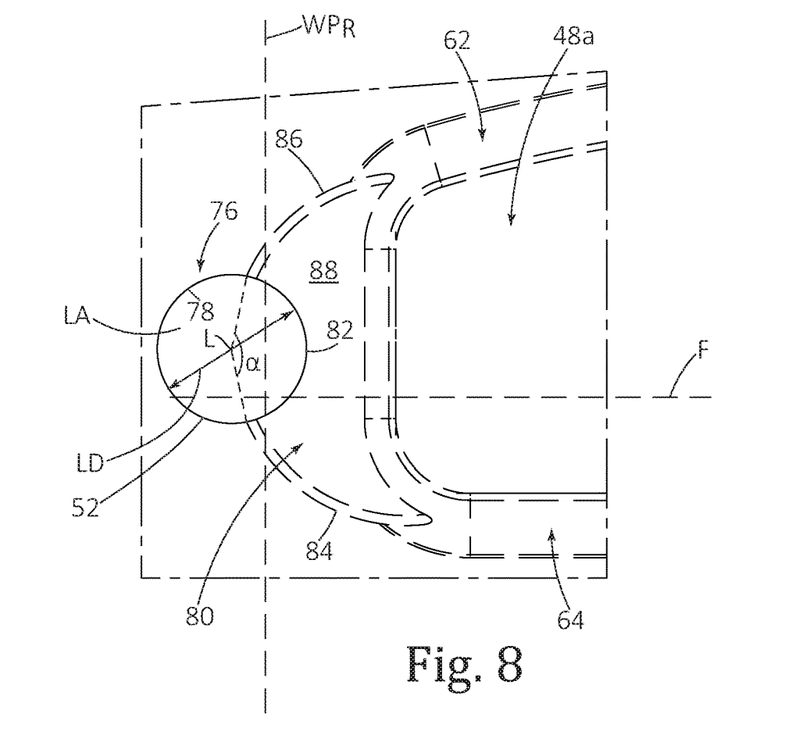
FIG. 8 is a detail of FIG. 2, indicated by reference numeral VIII, showing a cavity entrance portion in a side view.
Figure 9:
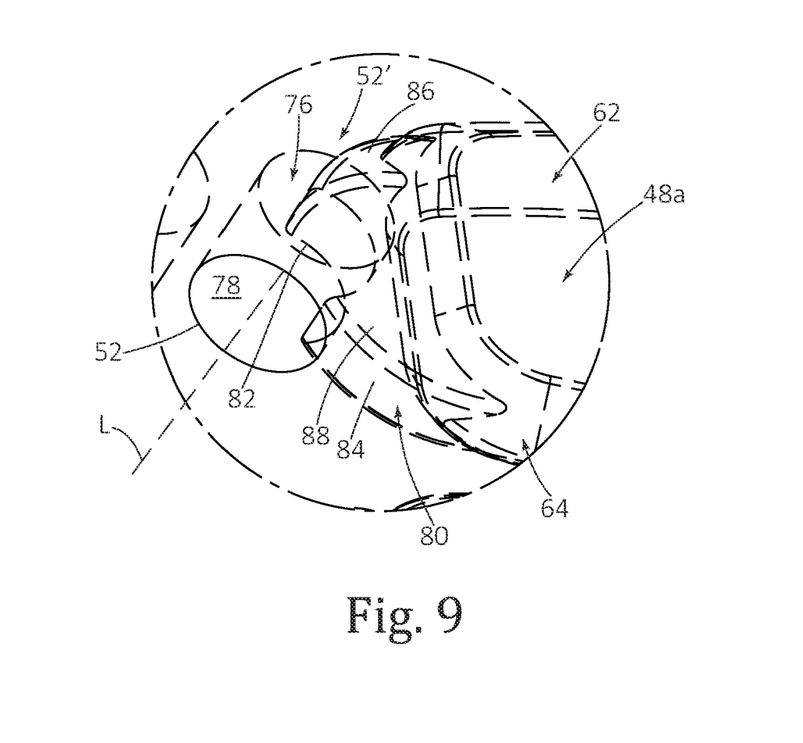
FIG. 9 is a detail of FIG. 1, indicated by reference numeral IX, showing the cavity entrance portion in a perspective view.

Referring to FIGS. 8 and 9, in accordance with some embodiments of the subject matter of the present application, the cavity inlet opening 52 can be formed on the holder peripheral surface 36. In particular, the cavity inlet opening 52 can be formed on one of the holder side surfaces 42. The coolant cavity 48a can include a cavity lateral portion 76. The cavity lateral portion 76 can open out to the holder peripheral surface 36 at the cavity inlet opening 52. The cavity lateral portion 76 can also open out to the holder peripheral surface 36, opposite the cavity inlet opening 52 (e.g. the holder side surface 42 where the cavity inlet opening 52 is not formed), to form a non-active cavity inlet opening 52'. Thus, the cavity lateral portion 76 can be a through hole. The provision of a non-active cavity inlet opening 52' allows the tool holder 22 to be reversible such that it is attachable to an adaptor via both sides of the tool holder 22. The non-active cavity inlet opening 52' is plugged to prevent the escape of coolant fluid. The cavity lateral portion 76 can extend along a lateral portion axis L. The lateral portion axis L can be parallel to the holder lateral axis E. As seen in FIG. 9, the lateral portion axis L may not be contained in the rearward widened cavity plane $WP_R$. In particular, the lateral portion axis L can be rearward of the rearward widened cavity plane $WP_R$.

In accordance with some embodiments of the subject matter of the present application, the cavity lateral portion 76 can include a lateral portion peripheral surface 78 which extends about the lateral portion axis L. The lateral portion peripheral surface 78 can extend from the cavity inlet opening 52. The lateral portion peripheral surface 78 can extend to the non-active cavity inlet opening 52' when present. The lateral portion peripheral surface 78 can have a cylindrical shape having a lateral portion diameter LD. The lateral portion diameter LD can be less than the narrowed height $N_H$.

The cavity lateral portion 76 has a lateral portion cross-sectional area LA which extends in a radial plane perpendicular to the lateral portion axis L. The lateral portion cross-sectional area LA is defined by the area enclosed by the lateral portion peripheral surface 78. A maximum lateral portion cross-sectional area LA is less than the cavity cross-sectional area CA at the forward narrowed cavity plane $NP_F$.

The cavity widening surface portion 70 can intersect the lateral portion peripheral surface 78. Stated differently, the cavity widening surface portion 70 can extend to the lateral portion peripheral surface 78.

Referring to FIGS. 8 and 9, in accordance with some embodiments of the subject matter of the present application, the coolant cavity 48a can include a cavity entrance portion 80. The cavity entrance portion 80 can be located between the cavity lateral portion 76 and the cavity major portion 68. The cavity entrance portion 80 can include opposing entrance inner and outer surfaces 84, 86. The cavity entrance portion 80 can include two opposing entrance side surfaces 88 which connect the entrance inner and outer surfaces 84, 86. The intersection of the two entrance side surfaces 88 with the entrance inner and outer surfaces 84, 86 can be filleted.

In accordance with some embodiments of the subject matter of the present application, the entrance outer surface 86 can be formed from a portion of the cavity upper surface 62, specifically the cavity widening surface portion 70. Likewise, the entrance inner surface 84 can be formed from a portion of the cavity lower surface 64, and the two entrance side surfaces 88 can be formed from a portion of a respective cavity side surface 66. It is noted in such a configuration, the cavity entrance portion 80 is located at the cavity weight-reducing portion 58.

In accordance with some embodiments of the subject matter of the present application, the entrance inner and outer surfaces 84, 86 and the two entrance side surfaces 88 intersect the lateral portion peripheral surface 78 to form an elongated through-pass 82. It is noted that the through-pass 82 is formed by a perimeter edge. The through-pass 82 can be formed on an angular extent of the lateral portion peripheral surface 78. The angular extent can have the shape of a truncated annular strip. The through-pass 82 can be spaced apart from the cavity inlet opening 52.

As shown in FIG. 8, in accordance with some embodiments of the subject matter of the present application, the intersections of the opposing entrance inner and outer surfaces 84, 86 with the lateral portion peripheral surface 78 (i.e., at the opposing angular extremities of the through-pass 82) subtend an intersect angle α relative to the lateral portion axis L. The intersect angle α can be greater than or equal to 45°. Preferably, the intersect angle α can be greater than or equal to 90°. Further preferably, the intersect angle α can be greater than or equal to 135°. The intersect angle α can be less than 270°. Preferably, the intersect angle α can be less than or equal to 180°. Such configurations provide a wide entrance for coolant exiting the cavity lateral portion 76 and entering the subsequent portion of the coolant cavity 48a.

In accordance with some embodiments of the subject matter of the present application, the entrance inner and outer surfaces 84, 86 can diverge away from each other, towards the holder bottom and top surfaces 40, 38, respectively, with increasing distance from the through-pass 82. Likewise, as discussed above, this also provides the advantage of increasing the flow rate of the coolant entering cavity entrance portion 80. In a side view of the tool holder 22 along the holder lateral axis E (i.e. FIG. 2), the entrance inner and outer surfaces 84, 86 can be concavely curved, or prismatically concave. Preferably, the entrance inner and outer surfaces 84, 86 can be concavely curved. The entrance inner and outer surfaces 84, 86 can be defined by a radius.

By virtue of the cavity entrance portion 80, the flow rate of the coolant entering coolant entrance cavity 80 is increased. For example, in testing a flow rate of 14.4 L/min has been achieved, compared to a flow rate of 9.8 L/min for standard tool holders manufactured by subtractive manufacturing.

In accordance with some embodiments of the subject matter of the present application, in a direction along the holder lateral axis E, the cavity entrance portion 80 can be narrower than the cavity major portion 68.

It should be noted that an advantageous feature of subject matter of the present application is that a 25% weight reduction of the tool holder can be achieved without detrimentally affecting the rigidity of the tool holder.

It should also be noted that another advantageous feature of subject matter of the present application is that there is a single cavity that provides weight-reduction and also the conveyance of coolant. That is to say, an existing cooling cavity is enlarged in order to reduce weight. Hence, the tool holder has a simple design.

Although the subject matter of the present application has been described to a certain degree of particularity, it should be understood that various alterations and modifications could be made without departing from the spirit or scope of the invention as hereinafter claimed.

What is claimed is:

1. A light-weight tool holder (22), elongated along a holder longitudinal axis (B) thereof, the holder longitudinal axis (B) defining opposite forward and rearward directions ($D_F$, $D_R$), the tool holder (22) being integrally formed to have unitary one-piece construction and comprising:
a holder forward end surface (28), a holder rearward end surface (30) and a holder peripheral surface (36) extending therebetween, the holder peripheral surface (36) extending about the holder longitudinal axis (B);
an insert pocket (44a), for releasably retaining a cutting insert (24), located at a forward end (32) of the tool holder (22);
a shank portion (46) extending rearwardly from the insert pocket (44a); and
a coolant cavity (48a) having a cavity central axis (F), a cavity inlet opening (52), at least one cavity outlet opening (54) and a cavity weight-reducing portion (58) between the cavity inlet opening (52) and the at least one cavity outlet opening (54); wherein:
the cavity weight reducing portion (58) has a cavity cross-sectional area (CA) extending in a radial plane perpendicular to the holder longitudinal axis (B); and
the cavity weight reducing portion (58) comprises a cavity weight-reducing peripheral surface (60), extending about the cavity central axis (F), and comprising a cavity upper surface (62) extending along the cavity central axis (F), the cavity upper surface (62) comprising:
a cavity widening surface portion (70), which decreases in distance from the holder peripheral surface (36), and along which the cavity cross-sectional area (CA) increases, both with increasing distance from the cavity inlet opening (52); and
a cavity narrowing surface portion (72), located further from the cavity inlet opening (52) than the cavity widening surface portion (70), which increases in distance from the holder peripheral surface (36), and along which the cavity cross-sectional area (CA) decreases, both with increasing distance from the cavity inlet opening (52).

2. The tool holder (22), according to claim 1, wherein the cavity widening surface portion (70) and the cavity narrowing surface portion (72) adjoin each other.

3. The tool holder (22), according to claim 1, wherein the tool holder (22) is solid between the cavity narrowing surface portion (72) and the holder peripheral surface (36).

4. The tool holder (22), according to claim 1, wherein:
the cavity upper surface (62) further comprises an auxiliary cavity widening surface portion (74), located further from the cavity inlet opening (52) than the cavity narrowing surface portion (72);
the auxiliary cavity widening surface portion (74) decreases in distance from the holder peripheral surface (36), with increasing distance from the cavity inlet opening (52); and
the cavity cross-sectional area (CA) increases with increasing distance from the cavity inlet opening (52).

5. The tool holder (22), according to claim 4, wherein the auxiliary cavity widening surface portion (74) and the cavity narrowing surface portion (72) adjoin each other.

6. The tool holder (22), according to claim 4, wherein the auxiliary cavity widening surface portion (74) extends between rearward and forward auxiliary widened cavity planes ($AWP_R$, $AWP_F$) which are oriented perpendicular to the holder longitudinal axis (B), the forward auxiliary widened cavity plane ($AWP_F$) being further from the cavity inlet opening (52) than the rearward auxiliary widened cavity plane ($AWP_R$).

7. The tool holder (22), according to claim 6, wherein a portion of the auxiliary cavity widening surface portion (74) adjoining the rearward auxiliary widened cavity plane ($AWP_R$) is convexly curved or prismatically convex, when viewed in a longitudinal plane (LP) containing the cavity central axis (F) and intersecting the cavity upper surface (62).

8. The tool holder (22), according to claim 1, wherein:
the cavity widening surface portion (70) extends between rearward and forward widened cavity planes ($WP_R$, $WP_F$) which are oriented perpendicular to the holder longitudinal axis (B), the forward widened cavity plane ($WP_F$) being further from the cavity inlet opening (52) than the rearward widened cavity plane ($WP_R$); and
the cavity narrowing surface portion (72) extends between rearward and forward narrowed cavity planes ($NP_R$, $NP_F$) which are oriented perpendicular to the holder longitudinal axis (B), the forward narrowed cavity plane ($NP_F$) being further from the cavity inlet opening (52) than the rearward narrowed cavity plane ($NP_R$).

9. The tool holder (22), according to claim 8, wherein the cavity cross-sectional area (CA) at the forward widened cavity plane ($WP_F$) is greater than twice the cavity cross-sectional area (CA) at the forward narrowed cavity plane ($NP_F$).

10. The tool holder (22), according to claim 8, wherein:
the rearward and forward widened cavity planes ($WP_R$, $WP_F$) are spaced apart by a widening distance (DW);
the rearward and forward narrowed cavity planes ($NP_R$, $NP_F$) are spaced apart by a narrowing distance (DN); and
the narrowing distance (DN) is greater than the widening distance (DW).

11. The tool holder (22), according to claim 8, wherein, a portion of the cavity widening surface portion (70) adjacent the forward widened cavity plane ($WP_F$) is concavely curved, or prismatically concave, when viewed in a longitudinal plane (LP) containing the cavity central axis (F) and intersecting the cavity upper surface (62).

12. The tool holder (22), according to claim 8, wherein, a portion of the cavity narrowing surface portion (72) adjacent the rearward narrowing cavity plane ($NP_R$) is concavely curved, or prismatically concave, when viewed in a longitudinal plane (LP) containing the cavity central axis (F) and intersecting the cavity upper surface (62).

13. The tool holder (22), according to claim 8, wherein, a portion of the cavity narrowing surface portion (72) adjoining the forward narrowing cavity plane ($NP_F$) is convexly curved or prismatically convex, when viewed in a longitudinal plane (LP) containing the cavity central axis (F) and intersecting the cavity upper surface (62).

14. The tool holder (22), according to claim 1, wherein: the holder peripheral surface (36) comprises:
opposite holder top and bottom surfaces (38, 40); and
two opposite holder side surfaces (42) connecting the holder top and bottom surfaces (38, 40); and the insert pocket (44a) is located at the intersection of the holder top surface (38) and the holder forward end surface (28).

15. The tool holder (22), according to claim 14, wherein:
the tool holder (22) comprises a holder vertical axis (D) extending perpendicularly to the holder longitudinal axis (B) and intersecting the holder top and bottom surfaces (38, 40);
the tool holder (22) comprises a holder lateral axis (E) extending perpendicularly to the holder longitudinal axis (B) and intersecting the two holder side surfaces (42); and
the tool holder (22) is narrower along the holder lateral axis (E) than along the holder vertical axis (D), and also narrower along the holder vertical axis (D) than the holder longitudinal axis (B).

16. The tool holder (22), according to claim 14, wherein:
the cavity weight-reducing peripheral surface (60) comprises:
a cavity lower surface (64) opposite the cavity upper surface (62), the cavity upper surface (62) being closer to the holder top surface (38) than the cavity lower surface (64); and
two opposite cavity side surfaces (66) extending between the cavity effective and non-effective surfaces (62, 64).

17. The tool holder (22), according to claim 16, wherein:
the cavity weight-reducing portion (58) comprises a cavity major portion (68); and
at the cavity major portion (68), the cavity side surfaces (66) are planar and parallel with each other.

18. The tool holder (22), according to claim 17, wherein at the cavity major portion (68) at least one of the cavity upper surface (62) and the cavity lower surface (64) is prismatically concave, having two sub-surfaces (62a, 62b, 64a, 64b) which extend from the cavity side surfaces (66) and intersect with each other.

19. The tool holder (22), according to claim 14, further comprising:
a second insert pocket (44b) and a second coolant cavity (48b), the second insert pocket (44b) being located at the intersection of the holder top surface (38) and the holder rearward end surface (30);
a third insert pocket (44c) and a third coolant cavity (48c), the third insert pocket (44c) being located at the intersection of the holder bottom surface (40) and the holder forward end surface (28); and
a fourth insert pocket (44d) and a fourth coolant cavity (48d), the fourth insert pocket (44d) being located at the intersection of the holder bottom surface (40) and the holder rearward end surface (30).

20. The tool holder (22), according to claim 19, wherein:
the tool holder (22) comprises a holder vertical axis (D) extending perpendicularly to the holder longitudinal axis (B) and intersecting the holder top and bottom surfaces (38, 40);
the tool holder (22) comprises a holder lateral axis (E) extending perpendicularly to the holder longitudinal axis (B) and intersecting the two holder side surfaces (42); and
the tool holder (22) is 180° rotationally symmetric about at least one of the holder vertical axis (D), the holder longitudinal axis (B) and the holder lateral axis (E).

21. The tool holder (22), according to claim 1, wherein the cavity inlet opening (52) is formed on the holder peripheral surface (36).

22. The tool holder (22), according to claim 21, wherein the coolant cavity (48a) comprises a cavity lateral portion (76) which comprises a lateral portion peripheral surface (78) extending about a lateral portion axis (L) from the cavity inlet opening (52).

23. The tool holder (22), according to claim 22, wherein:
the cavity lateral portion (76) has a lateral portion cross-sectional area (LA) extending in a radial plane perpendicular to the lateral portion axis (L); and
a maximum lateral portion cross-sectional area (LA) is less than the cavity cross-sectional area (CA) at the forward narrowed cavity plane ($NP_F$).

24. The tool holder (22), according to claim 22, wherein the cavity widening surface portion (70) extends to the lateral portion peripheral surface (78).

25. The tool holder (22), according to claim 22, wherein:
the coolant cavity (48a) comprises a cavity entrance portion (80) which comprises opposing entrance inner and outer surfaces (84, 86) and two opposing entrance side surfaces (88) which connect the entrance inner and outer surfaces (84, 86), the entrance outer surface (86) being closer to the holder top surface (38) than the entrance inner surface (84); and
the entrance inner and outer surfaces (84, 86) and the two entrance side surfaces (88) intersect the lateral portion peripheral surface (78) forming an elongated through-pass (82), the through-pass (82) being formed on an angular extent of the lateral portion peripheral surface (78).

26. The tool holder (22), according to claim 25, wherein the entrance outer surface (86) is formed from a portion of the cavity widening surface portion (70).

27. The tool holder (22), according to claim 25, wherein:
the cavity inlet opening (52) opens out to one of the holder peripheral surface (36) and the holder rearward end surface (30) at the shank portion (46); and
the at least one cavity outlet opening (54) opens out to one of the holder peripheral surface (36) and the holder forward end surface (28) adjacent the insert pocket (44a).

28. The tool holder (22), according to claim 1, wherein:
a length of the cavity weight reducing portion (58) extends between 50%-90% of a distance (DL) along the holder longitudinal axis (B) between the cavity inlet opening (52) and the at least one outlet opening (54).

29. The tool holder (22), according to claim 25, wherein:
along a length of the cavity weight reducing portion (58), the coolant cavity (48a) has a cavity volume VC and the tool holder (22) has a total volume of VT; and
the cavity volume and the tool holder volume have a ratio that satisfies $0.2 \leq VC/VT \leq 0.7$.

30. The tool holder (22), according to claim 25, wherein:
the holder peripheral surface (36) comprises opposite holder top and bottom surfaces (38, 40) and two opposite holder side surfaces (42) connecting the holder top and bottom surfaces (38, 40);
the tool holder (22) has a holder height ($H_H$) between the holder top and bottom surfaces (38, 40);
the cavity weight-reducing portion (58) comprises a cavity major portion (68);
at the cavity major portion (68), the cavity side surfaces (66) are planar and parallel with each other; and
along the cavity major portion (68), the coolant cavity (48a) has a maximum height that is at least 35% of the holder height ($H_H$) and a minimum height that is at least 10% of the holder height ($H_H$).

31. A light-weight tool holder (22), elongated along a holder longitudinal axis (B) thereof, the holder longitudinal axis (B) defining opposite forward and rearward directions ($D_F$, $D_R$), the tool holder (22) being integrally formed to have unitary one-piece construction and comprising:
a holder forward end surface (28), a holder rearward end surface (30) and a holder peripheral surface (36) extending therebetween, the holder peripheral surface (36) extending about the holder longitudinal axis (B);
an insert pocket (44a), for releasably retaining a cutting insert (24), located at a forward end (32) of the tool holder (22);
a shank portion (46) extending rearwardly from the insert pocket (44a); and
a coolant cavity (48a) having a cavity central axis (F), a cavity inlet opening (52), at least one cavity outlet opening (54) and a cavity weight-reducing portion (58) between the cavity inlet opening (52) and the at least one cavity outlet opening (54); wherein:
a length of the cavity weight reducing portion (58) extends between 50%-90% of a distance (DL) along the holder longitudinal axis (B) between the cavity inlet opening (52) and the at least one outlet opening (54);
along a length of the cavity weight reducing portion (58), the coolant cavity (48a) has a cavity volume VC and the tool holder (22) has a total volume of VT; and
the cavity volume and the tool holder volume have a ratio that satisfies $0.2 \leq VC/VT \leq 0.7$.

32. The tool holder (22), according to claim 31, wherein:
the cavity weight reducing portion (58) comprises a cavity weight-reducing peripheral surface (60), extending about the cavity central axis (F), and comprising a cavity upper surface (62) extending along the cavity central axis (F), the cavity upper surface (62) comprising:
a cavity widening surface portion (70), which decreases in distance from the holder peripheral surface (36), and along which the cavity cross-sectional area (CA) increases, both with increasing distance from the cavity inlet opening (52); and
a cavity narrowing surface portion (72), located further from the cavity inlet opening (52) than the cavity widening surface portion (70), which increases in distance from the holder peripheral surface (36), and along which the cavity cross-sectional area (CA) decreases, both with increasing distance from the cavity inlet opening (52).

33. A cutting tool (20) comprising:
a tool holder (22) in accordance with claim 1; and
a cutting insert (24), having a cutting edge (26) and being releasably retained in the insert pocket (44a).

34. The cutting tool (20), according to claim 33, further comprising:
a second insert pocket (44b) and a second coolant cavity (48b), the second insert pocket (44b) being located at the intersection of the holder bottom surface (40) and the holder forward end surface (28);
a third insert pocket (44c) and a third coolant cavity (48c), the third insert pocket (44c) being located at the intersection of the holder top surface (38) and the holder rearward end surface (30);
a fourth insert pocket (44d) and a fourth coolant cavity (48d), the fourth insert pocket (44d) being located at the intersection of the holder bottom surface (40) and the holder rearward end surface (30); and three additional cutting inserts (24); wherein:
  each cutting insert (24) is releasably retained in a respective one of the second, third and fourth insert pockets (44*b*, 44*c*, 44*d*).

\* \* \* \* \*